United States Patent Office 2,952,541
Patented Sept. 13, 1960

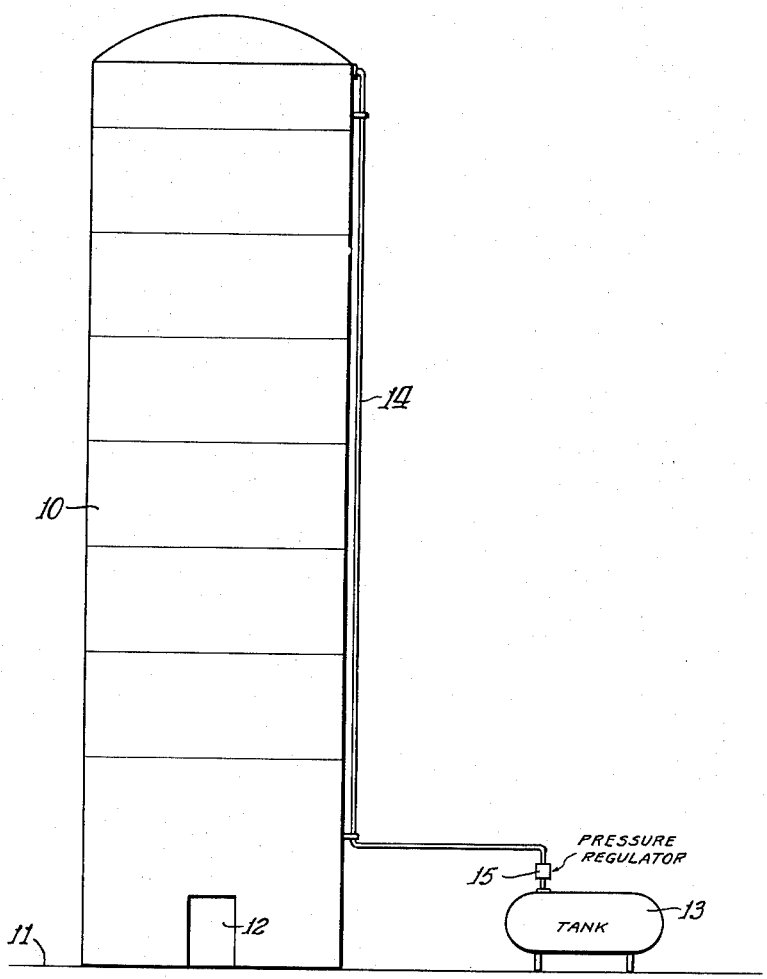

2,952,541
CROP PRESERVING STRUCTURES AND METHODS
Paul Edwin Fayhee, Prairie City, Ill.
Filed Sept. 29, 1958, Ser. No. 763,899
3 Claims. (Cl. 99—8)

My invention relates to crop storage and preserving, and more particularly to structures and methods for storing and preserving grains and legumes.

Such crops have commonly been stored in storage bins or silos, having been cut and compressed therein so that they are preserved by their own fermentation, particularly due to the presence of oxygen.

It is an object of the present invention to provide improved structures and methods for preserving such crops wherein the usual fermentation is prevented and the crops are preserved in more nearly their original condition.

It is a more particular object to provide such improved structures and methods by means of which oxygen is withheld from the stored crops and instead carbon dioxide is supplied to the crops for preserving them.

Still more particularly, it is an object of the invention to supply carbon dioxide to the top of a crop storage bin or silo from an external carbon dioxide tank for these purposes.

The invention consists of the novel constructions, arrangements, devices and methods to be hereinafter described and claimed for carrying out the above stated objects and such other objects as will appear from the following description of a preferred form of the invention illustrated with reference to the accompanying drawing which shows a side view of a storage bin and a gas tank connected to the bin.

Referring now to the drawing, a storage container, bin or silo 10 is shown which may be positioned on the ground 11 or on any suitable foundation. The storage bin 10 is sealed and is substantially air tight and may be constructed out of steel, for example. The bin 10 is adapted to contain grain, such as corn, ensilage, silage or legumes, and these may be withdrawn from the bin 10 for use by means of a door 12 located at the bottom of the bin.

A bottle gas container 13 having carbon dioxide under pressure therein is connected by a pipe or tubing 14 with the storage bin 10 at the top of the bin. A pressure regulator 15 of conventional construction is in the pipe 14 and regulates the carbon dioxide that flows through the pipe to the top of the bin 10 between zero and 10 pounds per square inch.

In operation, the bin or silo 10 is filled or partially filled with grain, ensilage, corn, silage or legumes by conventional methods, such as from the top through any suitable trap door (not shown). With the door 12 being closed, the bin is then very nearly air tight. The regulator 15 or other valve in the line 14 is then opened, and the regulator 15 then allows carbon dioxide to fill the bin 10, and the regulator 15 maintains the carbon dioxide pressure in the bin between zero and 10 pounds per square inch. The carbon dioxide, being heavier than air, passes downwardly from the top of the bin 10 and forces the air up where it remains at the top of the structure away from the stored material, and the bin contents are thus completely surrounded by carbon dioxide.

When contents of the bin 10 is removed for usage through the door 12, and the tank 13 is again connected through the pipe 14 with the top of the bin 10 after having been disconnected when the contents were being removed, the carbon dioxide again moves downwardly within the bin 10 and fills the bin.

The carbon dioxide in the bin 10 deletes all oxygen from contact with the ensilage or other contents of the bin which would otherwise cause the bin contents to spoil. With the illustrated application of an external source of carbon dioxide to the bin and its contents, the bin contents of grain, corn, ensilage, silage or legumes may be stored for long periods of time without spoilage.

I have found that the application of an external source of carbon dioxide as from the tank 13 to a storage bin 10 is very effective in preventing the spoilage of high moisture grain, legumes and ensilage. When high moisture corn is part of the contents of the bin 10, the application of carbon dioxide from the tank 13 is particularly effective in preserving the bin contents.

The application of carbon dioxide from the tank 13 to the bin 10 advantageously prevents the usual fermentation of the bin contents that occurs, which has some limited preserving functions, and preserves the bin contents for a longer time in more nearly its original condition.

I wish it to be understood that my invention is not to be limited to the specific constructions and methods shown and described, except only insofar as the claims may be so limited, as it will be understood to those skilled in the art that changes may be made without departing from the principles of the invention.

I claim:

1. In a method of preserving crops, the steps which comprise putting the crops into a container, and supplying carbon dioxide to said container before any fermentation of the crops has taken place so that the crops in the container are surrounded by carbon dioxide and oxygen is substantially excluded from the crops to preserve the crops in substantially their original condition.

2. In a method of preserving crops, the steps which comprise, putting the crops into a substantially closed container, and suppling carbon dioxide to the top of said container before any fermentation of the crops has taken place so that the carbon dioxide moves downwardly through the crops to surround them and oxygen is substantially excluded from the crops to preserve the crops in substantially their original condition.

3. In combination, a substantially air tight silo for storing grains, legumes and other crops, a source of carbon dioxide under pressure, and means for connecting said carbon dioxide source to the top of said silo so that the carbon dioxide substantially fills said silo and surrounds the crops therein so as to substantially prevent fermentation of the crops and preserve them in substantially their original condition.

References Cited in the file of this patent

UNITED STATES PATENTS

| | | |
|---|---|---|
| 1,629,077 | Holken | May 17, 1927 |
| 2,345,814 | Harrison | Apr. 4, 1944 |